July 10, 1951          F. W. GEORGE          2,559,717
VEHICLE SIGNAL SWITCHING MEANS
Filed Sept. 13, 1946
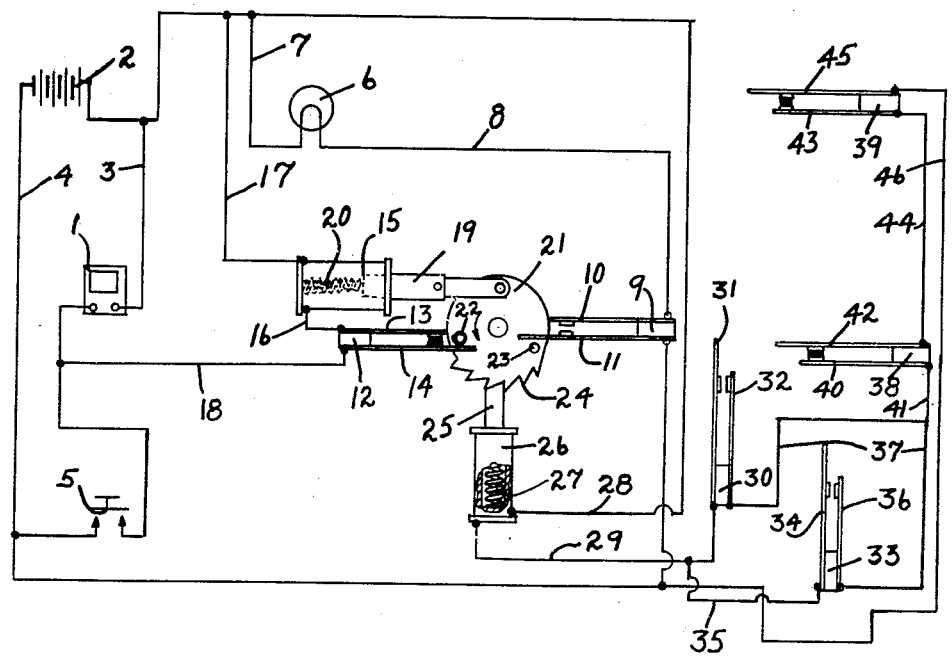
Inventor
Frank W. George
By
Glenn L. Fish
Attorney Patented July 10, 1951

2,559,717

UNITED STATES PATENT OFFICE 2,559,717

VEHICLE SIGNAL SWITCHING MEANS

Frank W. George, Spokane, Wash.

Application September 13, 1946, Serial No. 696,849

1 Claim. (Cl. 200—105)

This invention relates to a vehicle signal and it is one object of the invention to provide a signal system so arranged that when a passenger presses a button to indicate to the driver of the vehicle that he wishes to leave the bus at the next stop a signal light at the rear of the bus will be illuminated and thus give warning to the driver of an automobile or other vehicle following the bus that a stop is to be made and a person alight from the bus. Therefore the driver of the following vehicle will have warning that a stop is to be made by the bus and danger of colliding with the bus or striking and injuring a passenger getting off the bus will be reduced to a minimum.

Another object of the invention is to provide a signaling system for a bus so arranged that the outside signaling light will remain active until the passenger has alighted from the bus and the door closed and thus eliminate danger of accidents due to the driver of a following vehicle not seeing the signal light when the passenger presses the button.

Another object of the invention is to provide a signaling system for buses wherein a switch operating mechanism is automatically set when the signal button is pressed and then released by the closing of a door opened to allow passengers to alight from the bus, the switch being kept closed during opening of the door and the outside signal light being immediately extinguished when the door is closed.

Another object of the invention is to provide a signaling system which can be installed in buses of conventional design.

The invention is illustrated in the accompanying drawing wherein there is shown a wiring diagram of the improved signaling system.

The bus in which the improved signaling system is installed will be of conventional construction and provided with the usual doors for closing entrances through which passengers enter and leave the bus. A signal bell or equivalent signal 1 is mounted in the bus and connected with a battery 2 by line wires 3 and 4, a push button switch 5 being interposed in the line wire 4 so that when this switch is closed by a passenger pressing upon its button the signal 1 will be sounded and thus indicate to the driver of the bus that a passenger desires to alight at the next stop. A signal lamp 6 is mounted externally of the bus, at the rear thereof so that it may be easily seen by the driver of a following automobile or other vehicle, and danger of accidents due to the following vehicle striking a person alighting from the bus reduced to a minimum. This signal light 6 is connected with opposite sides of the battery by circuit wires 7 and 8 which are cut into the circuit wires 3 and 4, and, in order to normally break the circuit through the signal lamp, there has been provided a switch 9 having contact strips 10 and 11 normally spaced from each other to open the switch. A switch 12 which is normally closed and has contact strips 13 and 14 is connected in series with a solenoid 15 by a wire 16, and this switch and the solenoid are connected with opposite sides of the battery by circuit wires 17 and 18 cut into the wires 7 and 4 and from an inspection of the diagram it will be readily seen that when the switch 5 is closed the buzzer 1 will be sounded and at the same time the solenoid 15 energized and its plunger 19 drawn inwardly in opposition to action of the spring 20 of the solenoid. The plunger is connected with a disk 21 which is rotatably mounted and carries pins 22 and 23, and when this disk is turned the pin 22 will engage the contact strip 14 and open switch 12 and the pin 23 will close the switch 9 by engaging its contact strip 11. Closing of the switch 9 causes the signal bulb 6 to be lighted and since the disk 21 has a portion of its marginal edge face formed with ratchet teeth 24 engaged by the plunger 25 of a solenoid 26 the lamp will remain lighted until the plunger 25 is retracted. The spring 27 of the solenoid 26 urges the plunger outwardly and yieldably holds it in engagement with the rack teeth of the disk. Since the switch 12 is opened by turning of the disk the circuit through the buzzer will be broken and loss of current and danger of burning out the buzzer will be eliminated. The wires 28 and 29 for the solenoid 26 are connected with the circuit wire 7 and with a switch 30 which has its contact strips 31 and 32 spaced from each other to normally hold the switch open. A switch 33 which is also normally open has its contact strip 34 connected with the wire 29 by a wire 35 and from its contact 36 extends a wire 37 which connects it with the contact 32 of the switch 30. Other switches 38 and 39 which are normally closed are provided, the switch 38 having its contact strip 40 connected with the wire 37 by a wire 41 and its contact 42 connected with the contact 43 of the switch 39 by a wire 44. The contact 45 of switch 39 has secured to it a wire 46 which has its other end cut into the wire 4. The switches 30, 33, 38 and 39 are mounted at the door of the bus and when the doors are closed the switches 30 and 33 will be momentarily closed and then return to an opened position and switches 38 and 39 will be held closed but when the doors are opened the switches 38 and 39 will be opened and the plunger 25 of solenoid 26 will be held extended by the spring 27 so that the disk 21 can not be turned to its normal position. When the doors are closed after a passenger has alighted the solenoid 26 will be energized and its plunger 25 retracted to release the disk and allow the disk to be returned to its normal position by outward movement of the plunger 19 of the solenoid 20. Return of the disk to its normal position causes the signal lamp 6 to be extinguished and the driver of a vehicle back of the bus will know that the doors of the bus have been closed and the bus is about to proceed along its route. The switches are actuated during movement of the doors. A signaling system so constructed will be very effective when used as a buzzer 1 will be sounded to indicate to the driver of the bus that a passenger desires to leave the bus and at the same time the outside signal bulb will be illuminated to indicate that the bus is going to stop and it will be kept lighted until the passengers have alighted from the bus and the doors closed.

Having thus described the invention, what is claimed is:

In a device of the character described, a normally open switch having a short stationary contact strip and a long movable contact strip, a disk mounted for turning movement and provided with rack teeth along its marginal edge face, the movable contact strip of said switch having its free end over-lapping a side face of said disk, an abutment pin projecting laterally from the said side face of said disk in position for engaging the free end of the movable contact strip and closing the switch when the disk is turned in one direction out of its normal position, a solenoid having its plunger yieldably held extended and pivoted at its outer end to said disk and serving to turn the disk out of the normal position and move its abutment pin to effect closing of the switch when the solenoid is energized to retract its plunger, a normally closed switch in series with said solenoid allowing energizing of the solenoid when a circuit is closed through the solenoid, the normally closed switch having a short stationary contact strip and a long movable contact strip having its free end overlapping the said side face of said disk, said disk having a second abutment pin projecting laterally in spaced relation to the first pin circumferentially of the disk and disposed in position for engaging the free end of the movable contact strip of the normally closed switch when the disk is turned by retraction of the plunger of the solenoid, a second solenoid having its plunger yieldably held extended and constituting a latch engaging the rack teeth of the disk and releasably holding the disk in its turned position, the last mentioned solenoid when energized having its plunger retracted to release the disk and permit return of the disk to its normal position.

FRANK W. GEORGE.

REFERENCES CITED

The following references are of record in the file of this patent:

UNITED STATES PATENTS

| Number | Name | Date |
|---|---|---|
| 840,516 | Rennert | Jan. 8, 1907 |
| 1,108,482 | Winston | Aug. 25, 1914 |
| 1,129,305 | McElroy | Feb. 23, 1915 |
| 1,169,138 | Downs et al. | Jan. 25, 1916 |
| 1,186,561 | Evans | June 13, 1916 |
| 1,262,675 | Kirk | Apr. 16, 1918 |
| 1,342,579 | Basil et al. | June 8, 1920 |
| 1,564,815 | Ballance | Dec. 8, 1925 |
| 1,731,580 | Knaak | Oct. 15, 1929 |
| 1,902,490 | Crago | Mar. 21, 1933 |
| 1,977,703 | Swarthwout | Oct. 23, 1934 |
| 2,302,872 | Landrum | Nov. 24, 1942 |